United States Patent [19]

McLaughlin et al.

[11] Patent Number: 5,604,860
[45] Date of Patent: Feb. 18, 1997

[54] FEATURE LIBRARY AND STORED CUSTOMIZED CONTROL INTERFACES

[75] Inventors: Denise C. McLaughlin, Macedon; Frank Marino, Jr., Rochester, both of N.Y.

[73] Assignee: Xerox Corporation, Stamford, Conn.

[21] Appl. No.: 329,811

[22] Filed: Oct. 27, 1994

[51] Int. Cl.⁶ ........................................... G06F 3/14
[52] U.S. Cl. ............................................ 395/326; 395/352
[58] Field of Search ..................................... 395/145, 161, 395/700, 800, 155, 156, 157, 158, 159, 160; 364/408; 370/85.8

[56] References Cited

U.S. PATENT DOCUMENTS

| | | | |
|---|---|---|---|
| 4,711,560 | 12/1987 | Hosaka et al. | 355/14 C |
| 5,081,699 | 1/1992 | Filion et al. | 395/145 |
| 5,170,466 | 12/1992 | Rogan et al. | 395/145 |
| 5,218,406 | 6/1993 | Ebner | 355/205 |
| 5,301,350 | 4/1994 | Rogan et al. | 395/800 |
| 5,321,816 | 6/1994 | Rogan et al. | 364/408 |
| 5,323,393 | 6/1994 | Barrett et al. | 370/85.8 |

*Primary Examiner*—Mark R. Powell
*Assistant Examiner*—Buay Lian Ho
*Attorney, Agent, or Firm*—Ronald F. Chapuran

[57] ABSTRACT

A method of customizing and storing an interface control for an imaging machine by entering an interface control customizing mode providing access to a library of control features, selecting a set of control features for use on a given machine, and arranging the set of control features in a given configuration on a scaled representation of an interface control. The set of control features and given configuration is then stored in memory, and referenced with a given identifier in order that upon accessing the identifier the set of control features and given configuration are provided on the interface control display.

17 Claims, 10 Drawing Sheets and stored customized control panels using a features library.

FEATURE LIBRARY AND STORED CUSTOMIZED CONTROL INTERFACES

BACKGROUND OF THE INVENTION

The present invention relates to a user interface, in particular, a user interface that allows an operator to create and store customized control panels using a features library.

To meet modern document needs, document systems have been provided with ever expanding feature sets for various local and remote applications such as document copy, document distribution, document storage, and document printing. In the past, to expand feature sets, existing control panels were usually augmented with more menu layers, an increased number of categories of features, and increased numbers of buttons and icons. As a result, end user operators are often confronted with a control panel search task in order to locate and access the particular set of features and electronic dialogs needed for a particular job.

This has only aggravated job set up complexity for operators. The problem is further intensified when multi-functional features such as fax, print, store, and distribute are required. In these situations, users and operators are often confused on the availability of features and proper selection and combination of features to achieve a given job objective. A mass of dialog information and multiple options can bewilder an operator leading to erroneous selections. In particular, a machine site given to very specific requirements is not well served by a machine control panel that continually displays unneeded prompts, options and features. Also simple job requests don't need a multitude of features and options on a control panel to accomplish the job requirement.

U.S. Pat. No. 5,081,699, assigned to the same assignee as the present invention, discloses the storing of preprogrammed jobs in preprogramming slots in memory and also discloses the transfer of preprogrammed jobs to a floppy disk for transfer to another machine. This system, however, is directed to storing preprogrammed job requirements, that is, storing in memory a given job requirement such as number of documents, copy sheet size, inserts, duplex operation, exceptions to specific pages, and other features. Thus, whenever a job requires the exact requirements or features as stored, the job can be initiated just by accessing the program slot where the requirements are stored. Such a stored program is handy for repeated identical requirements or is helpful if only slight modifications need to be made to the requirements. However, this technique only applies to job requirements and selecting features already available to complete the job. This technique is not pertinent to creating control panels and procedures used in satisfying a job requirement.

U.S. Pat. No. 4,711,560 discloses a copier which functions according to a sequence control program stored on floppy disk and loaded by a user. U.S. Pat. No. 5,218,406 discloses the use of memory cards to transfer diagnostic procedures to a machine or store diagnostic data retrieved from the machine. A difficulty with the aforementioned systems, however, is that they are directed to loading job requirements or diagnostic procedures or data from an external memory. On the other hand, the present invention is directed to an entirely different concept, the technique of fabricating and customizing the control panels or system for selecting the features to accomplish a given job requirement. The control panels and related dialog are tailored to meet a class of expected job requirements and the unique demands of a particular machine site.

It is an object of the present invention, therefore, to provide a new and improved user interface with the capability to selectively tailor the interface control panels and related screen dialog to meet expected job requirements. It is still another object of the present invention for an operator to provide customized control panels for a machine interface by selecting desired features from a library of features on the interface and arranging the features on a scaled representation of a control panel. Still another object of the present invention is to provide a plurality of customized user interfaces selectively tailored to particular job requirements and stored and accessed by the operator as required. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of customizing and storing an interface control for a machine by entering an interface control customizing mode providing access to a library of control features, selecting a set of control features for use on a given machine, arranging the set of control features in a given configuration on a scaled representation of an interface control, storing the set of control features and given configuration in memory, and referencing the set of control features and given configuration with a given identifier whereby upon accessing the identifier the set of control features and given configuration are provided on the interface control display.

BRIEF DESCRIPTION OF THE DRAWINGS

For a better understanding of the present invention, reference may be had to the accompanying drawings wherein the same reference numerals have been applied to like parts and wherein.

DESCRIPTION OF EMBODIMENT

Figure 1:
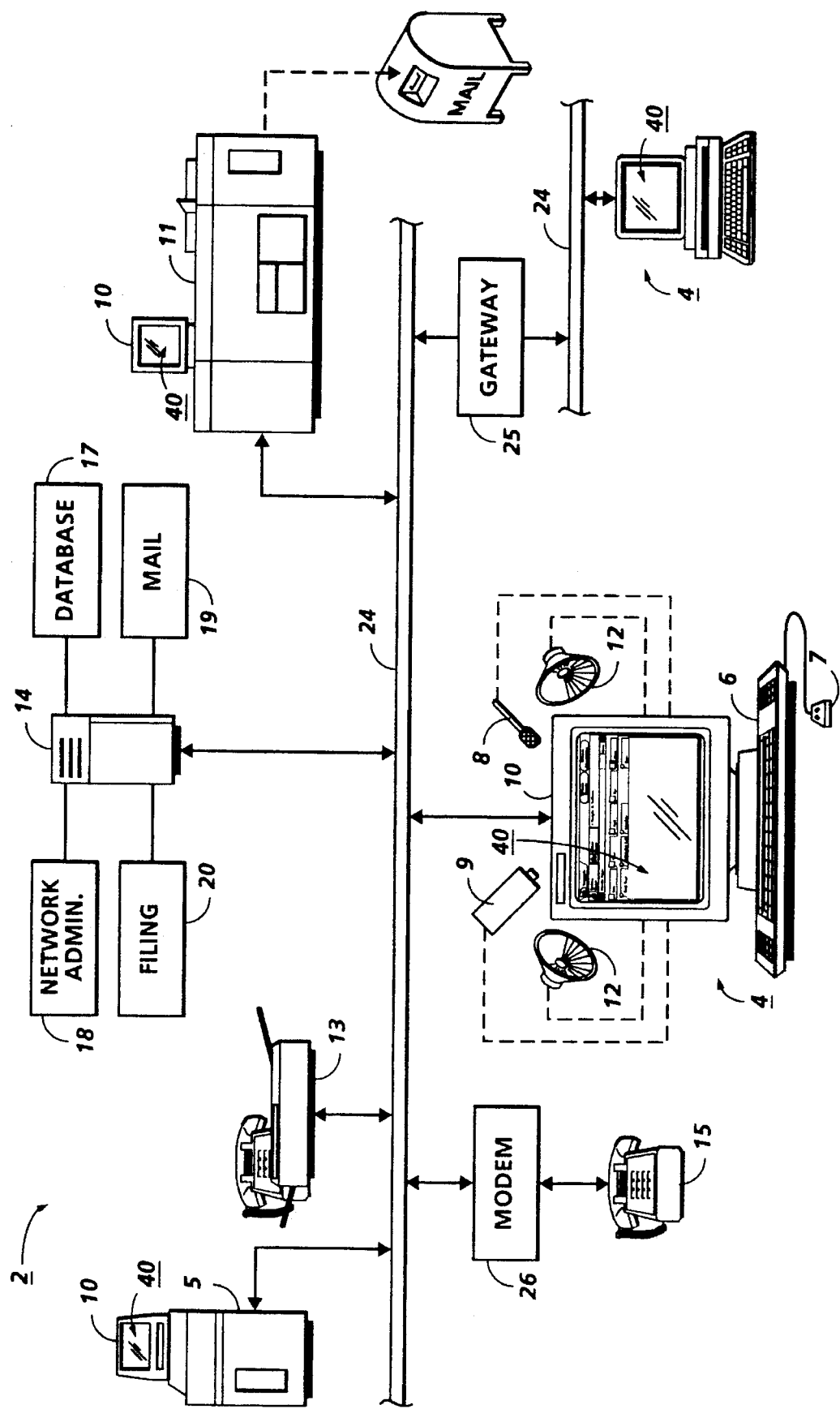
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. e-mail, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application. Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Global View TM ("GV") software available from Xerox Corporation, which uses abstractions such as a desktop, inbasket, outbasket and documents.

Figure 2:
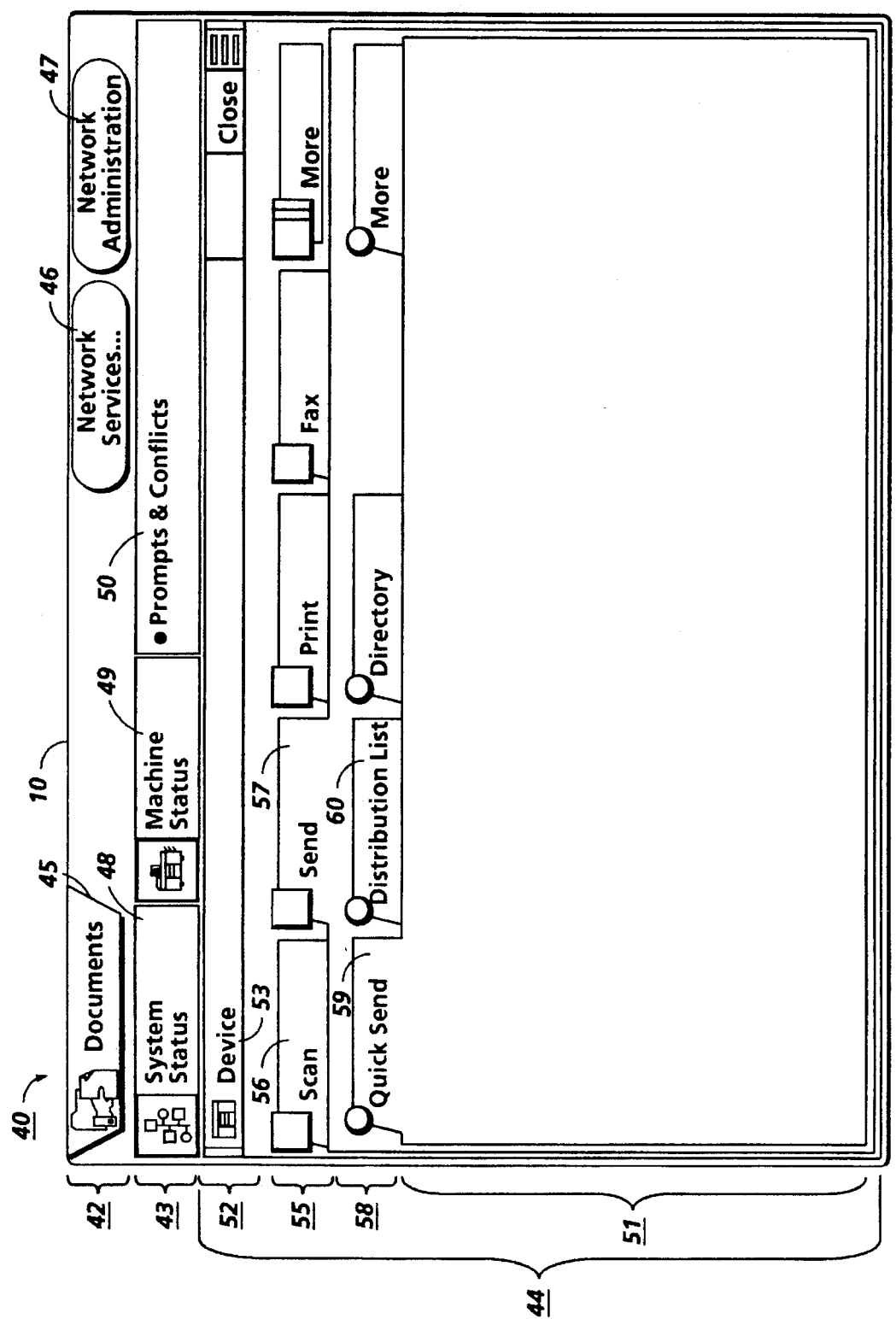
FIG. 2 is an enlarged view of a typical multi-device user interface for use on the display screens shown in FIG. 1.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows. For example, the user interface 40 on printer 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, e-mail, etc.) 19, ports (such as modem 26, network gateway 25), and other Work stations 4. Also, available in services area 44 are published communications channels 63 available from network administration 18. These are channels that have been provided to a utility (not shown) that manages network administration 18. These channels included in a user profile are provided by a user who is to receive data from other users on network 24. Other utilities available in network administration 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Device 54 would be the physical network publisher exporting the services. Service bar 55 groups services available on service 53. For example, a user could select a service module to access a specific document service (e.g. scan 56 or send 57). Service sub bar 58 provides access to sub-services within service modules. Workspace 51 provides a user area for preparing documents for distribution, which can include publication and archival.

Figure 3:
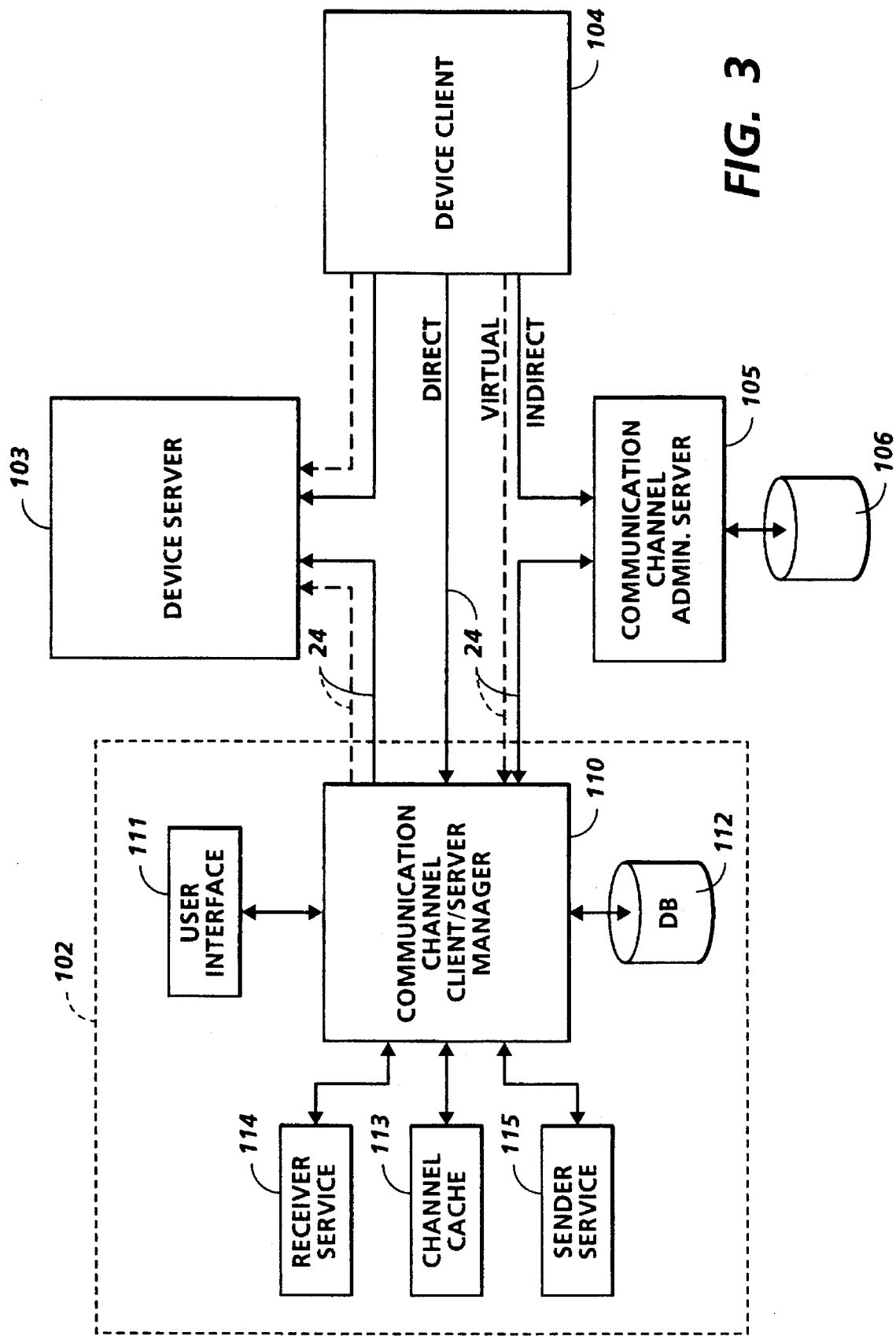
FIG. 3 shows a schematic view of a typical system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. For further detail of an exemplary system, reference is made to pending application D/92365, Ser. No. 07/130,929, incorporated herein.

In accordance with the present invention a Feature Library is used to assemble multifunctional user interface controls on dialog screens for fax machines, printers, and copiers, multifunctional devices, and workstations. The Feature Library allows an operator to easily assemble electronically an array of features to most effectively support many kinds of jobs. Customization is enabled via a scaled representation of a control panel, features added or deleted through simple on/off selectors, menus, and object drop and drag adjustable properties to change presentation styles and positioning of features. These dialog mechanisms enable different control panels to be created and used on the same product, and customers can easily devise their own customized control panels.

A multifunctional document system user interface (UI) will enable job programming for a variety of new tasks in document distribution, storage, retrieval, copying, and printing. Users often don't know how to best combine and use the features of a system. The Feature Library concept is an enabler for UI dialogs to address these needs, provide expandable customized solutions, and guide users on system uses. The Feature Library is included in an electronic UI dialog for the easy assembly of features on screens, to support any kind of job. This assembly is done before or after a product is in a customer site, by product developers or end users. Leveraging the flexibility of the electronic display medium, the complete array of possible multifunctional feature options are resident in software, but a useful subset of options are placed or removed from a particular job programming screen using simple object oriented methods.

All features in the electronic control panel layout are manipulable objects. They are retrieved, deleted, or moved electronically to compose job control screens. The arrangement and choice of feature categories are adjusted by dragging features across a reduced view of the final screen layout. Object properties associated with features and the layout are used to adjust presentation styles. One, or many of these control panels, once assembled, can be saved as a tailored solution for reuse to program jobs, and more than one control panel can reside on the same device for different needs. The Feature Library can be used to create unique multifunctional control panels to assist users with new applications and meet evolving needs.

Figure 4:
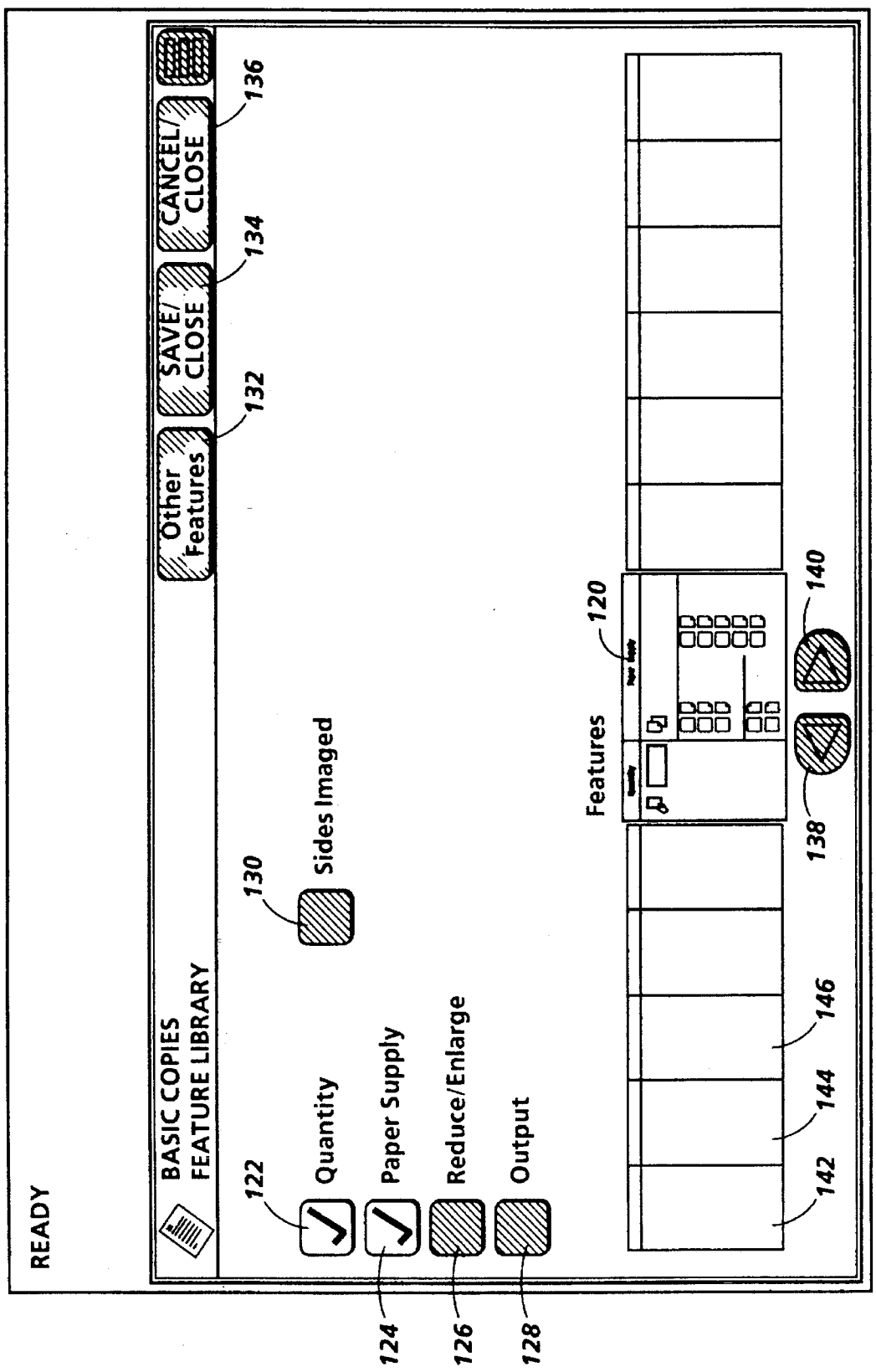
FIG. 4 shows a simulated screen image of the technique of interface control customizing in accordance with the present invention.

In accordance with the present invention, is the Feature Library is presented on a product UI dialog screen, showing options for assembling a Job programming screen or control panel as shown in FIG. 4. The Library is made available within a documenting system UI dialog. Users with access rights launch it generally by selecting a Feature Library command from a dialog menu bar. This opens a screen to adjust the current control lay out or adjust a default lay out as shown in FIG. 4. This screen contains several mechanisms for customizing job programming including a choice of features 116 to appear on a control panel and a scaled representation 120, showing a reduced view of a current job programming screen. In one embodiment, a thumbnail is placed on a grid and shows features and presentation style of the current screen layout as it appears during job programming. Each feature shown on the grid is selectable and can be dragged and dropped to move it to a new position. The grid has a property sheet to adjust its size and layout patterns (horizontal, vertical). There is also a rectangular viewable region over the thumbnail indicating what portion of the layout will be viewable on the full screen, based on available display size. It shows users any features placed outside the area which to be revealed on the full screen version only via window scrolling. Users adjust the position of the viewable region by moving it along the grid using scroll buttons 138 and 140 provided below the grid. Also, Other Features menu 132 lists all features possible in the system to retrieve additional or new options which appear in this menu when loaded into SW. Also, a Save/close option 134 is used for permanent storage of a programming layout to the device's memory or remote storage for use as needed on any device with electronic display or workstation. Each Layout is named for easy identification. Save/Close 136 returns the display to normal job programming, where saved versions are selectable by name and open to their full size for job programming.

Users check on or off any of a suggested feature set, or retrieve additional features from the menu. Checked features are added via animation to the scaled view. Features can be "unchecked" by users and deleted in the same manner. Features on the grid can also be selected with finger or mouse and dragged to new locations anywhere along the grid. Each feature has property options to define its display characteristics based on industry standards, or unique styles, as defined by product specifications. The property choices determines button types, etc, and the amount of grid space the feature will occupy on the lay out.

In accordance with the present invention, multiple control panels are provided on the same device to tailor job set ups for different individuals, workgroup practices, and job types. Individual control panels can be named, saved, and shared across networks. These control panels, can be used "as is", or act as a blueprint for users to create their own job set up controls.

As stated above, operators are faced with a search task just to find the particular features they need for a given job on today's control panels and electronic dialogs. In the past, control panels simply added more menu layers to the electronic display, increased the number of categories of features, added more buttons, etc. to address feature growth. This has aggravated job set up complexity for users, and the problem is heightened when multifunctional features for fax, print, store, distribute are added. Users no longer know what features are available on the system, let alone how to combine them efficiently to set up a job.

In accordance with the present invention, an electronic display medium is used to organize the dialog's features into any number of self contained control panels, which contain subsets of features derived to meet the needs of different individuals, workgroup practices, and jobs types. The overall result is a dialog with greater simplicity, set up efficiency, and tailor ability. Users choose one of any number of control panels available on the system to set up a job. The multiple control panel concept is extended to great advantage for feature rich multifunctional system. Multiple standard control panels for a product can organize features to optimize user convenience for known kinds of tasks (e.g. a specific kind of original/source document, going from film slides to paper, or to achieve a special type of output such as addressed envelopes). Or these control panels can be used to build new user expectations about what the system can do (e.g.features for automatic transmission of a scanned and copied image back to a workstation, or electronic distribution using a copier). Pre-assembled control panels can be used "as is", or be blueprints for users to create and save their own versions. Users can combine features to create new functionality via a custom/blank control panel option. Custom, control panels can also be created at a workstation using these same tools or created on another device and sent for use elsewhere.

In one embodiment, available control panel options appear as named buttons on a main dialog screen. Users select any of the available control panel options, and if they wish to use the default settings they simply press start to begin the job, for one touch job programming. If a user chooses to change control settings, any of the control panel screens are opened by double selecting the option button. Users can then use the displayed control panel to program.

Any displayed panel can also substitute for the main walk up screen if customers choose. Each control panel contains some of the same features found in other panels (such as paper supply and quantity) but can add or omit any other features. Also, a drop down menu is available from the window header bar to retrieve and add to the panel via a feature library-like listing, any other feature that might be needed by users on demand. Changes to layouts and settings may be saved.

For example, a copy service is presented to the user on the Main screen. The screen contains all the available copy control panels. Each is presented as a named button object which will open a control panel like programming screen. Along with an application name, control panel buttons may also have an associated information label or tag which a user can specify to convey one or two characteristic feature settings for a given control panel. Users can select any control panel button and then press start (thus using feature setting defaults). The following are examples of copy control panel screens, that might be available, for example, a basic copy control panel embracing simple copier practices using a full feature disclosure system to support basic jobs (e.g. vanilla 8.5×11 copy). Scrolling buttons would allow users to access more features than the display can show at one time. Task control panels can be tailored to provide the kinds of feature choices needed for specialized jobs like presentations or make ready pages needing image adjustments, also using progressive disclosure menus to maximize productivity for users. A production control panel could provide possibilities for using multiple control panels to support document structuring tasks, and production job management. Other templates are possible, such as a Copy/Fax control panel, or a personalized panel with a single user's choice of features or a specific document (e.g. Monthly newsletter).

With reference to FIG. 4, there is shown a typical screen display to enable an operator to customize operator controls. In particular, a feature or machine function library is made available to the operator to select and arrange a customized control. For example, the screen in FIG. 4 illustrates a quantity button 122, a paper supply button 124, a reduced/enlarged button 126, and output button 128 and a sides imaged button 130. These features can be selected in any suitable manner (such as highlighting) and positioned (such as moving or copying) reduced display 120. The reduced display 120 is a scaled representation of an actual screen display that will appear on the screen of the interface. This scaled representation is available for the operator to receive selected features as desired. Features not shown on the screen display can be made available through another features button 132 providing additional menus of available features.

In one embodiment scroll buttons 138, 140 slide the reduced display horizontally along a plurality of panels as identified at 142, 144, and 146. For each panel a set of selected features can be inserted or received from the machine function library. For example, when reduced display 120 overlaps panel 142, panel 142 will receive the selected features and when reduced display 120 overlays panel 144, panel 144 will receive the selected features and so forth for each panel.

It should be understood that each panel, such as panels 142, 144 and 146 may not be visible on the full display screen at one time. Thus the various panels provide a virtual control panel that is selectively displayed by scrolling buttons 138 and 140. It should also be understood that the use of scroll buttons 138, 140 and panels 147, 144, and 146 is only one mode of creating a customized control and that the scope of the present invention covers any suitable method including full displays, partial displays, windows and menus of selecting and positioning icons and machine features to create a unique control panel or frame.

As shown, a save/close button 134 allows the operator to store the representation as arranged on reduced display 120 for future use. The cancel/close button 136 or any other suitable operation would cancel the customizing operation. Various memory slots are available to store and save the panel upon completion by the operator. In essence, the operator is provided with suitable control buttons to select and arrange various machine features to meet a given requirement. It should be noted that the screen of FIG. 4 illustrates only a few features and that many more features could be shown on the screen of FIG. 4 or on subsequent screens for selection by the operator and positioning on the scaled representation 120.

Figure 5:
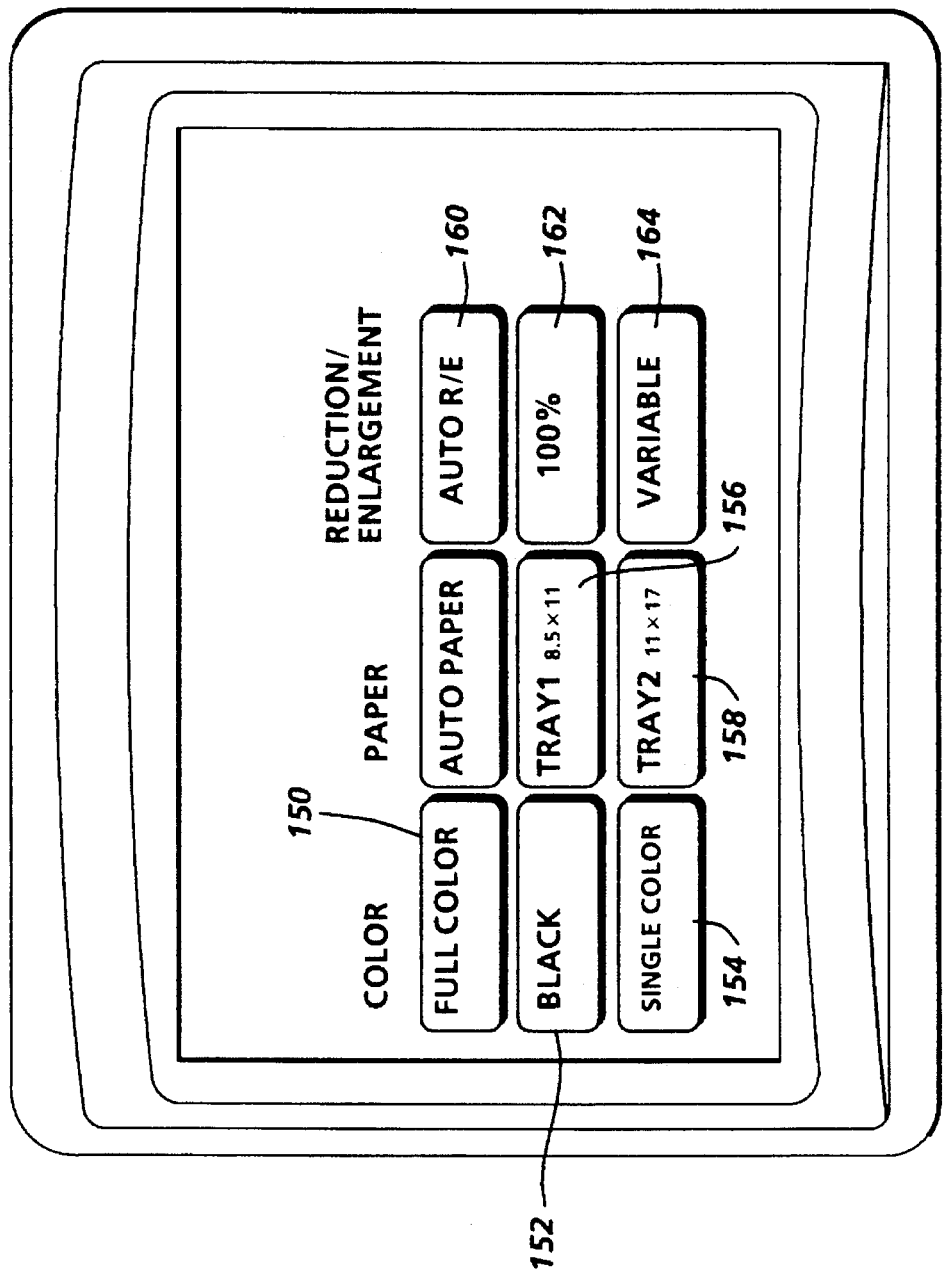
FIGS. 5 and 6 illustrate screens providing a library of features for customized interface controls in accordance with the present invention.

For example, FIG. 5 illustrates another typical screen display for selecting features: that could be available. For example, FIG. 5 illustrates a set of color features including full color 150, black 152, and single color 154; a paper set including tray 1 of 8.5×11 paper shown at 156 and tray 2 of 11×17 paper illustrated at 158. In addition, there is a reduction/enlargement set including auto reduction enlargement 160, 100 percent reduction enlargement at 162, and variable reduction enlargement at 164.

Figure 6:
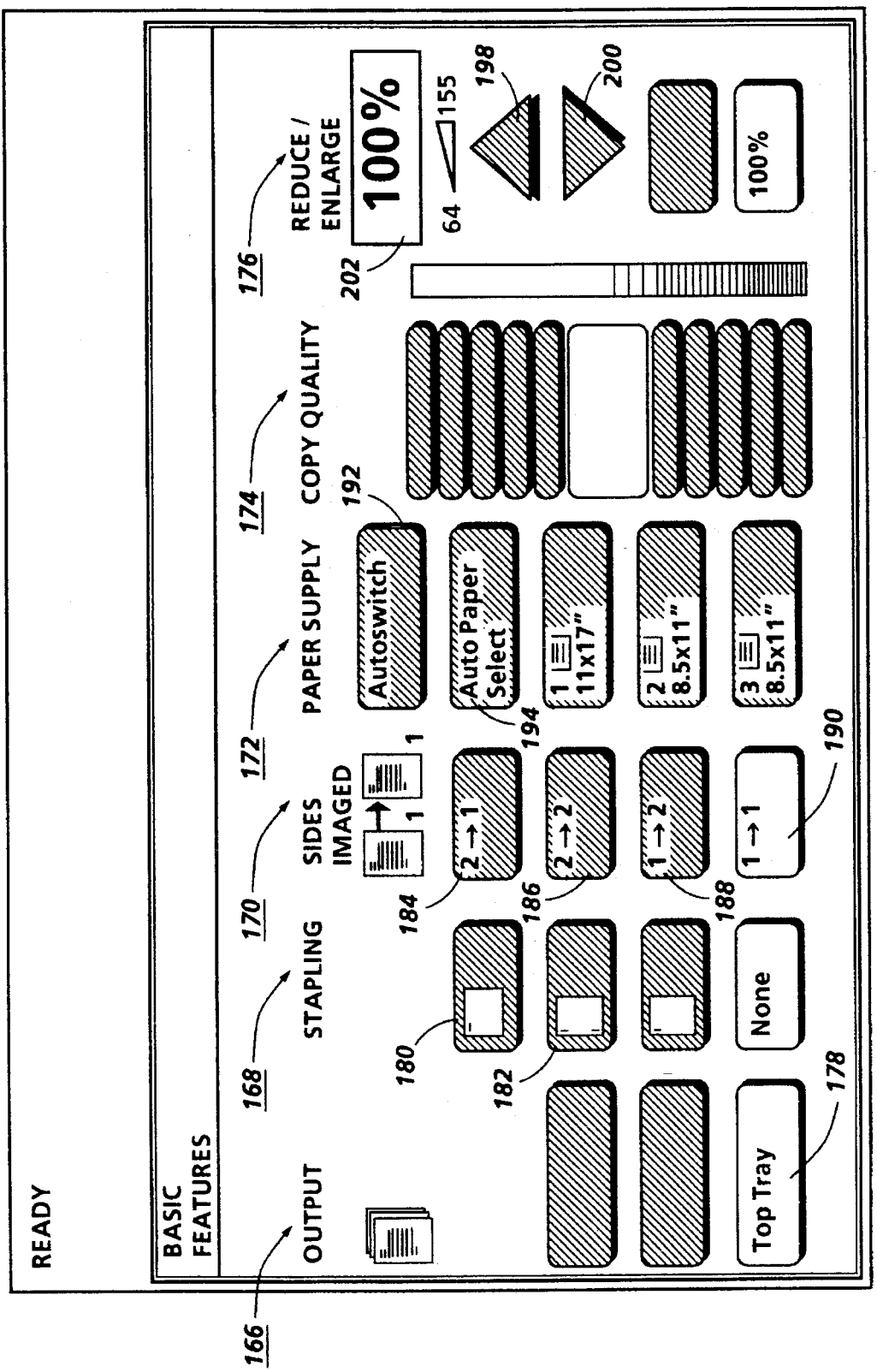

FIG. 6 illustrates another display screen as an example of another format for presenting features to be selected by the operator. In particular, there are sets of features covering output 166, stapling 168, sides imaged 170, paper supply 172, copy quality 174, and reduction/enlargement 176. The output set could provide such features as top tray 178 or other output modes including finishing. The stapling set could include various stapled configurations shown at 180 and 182. The sized image set 170 could provide various configurations such as duplex to simplex 184, duplex to duplex 185 simplex to duplex 188, and simplex to simplex 190. The paper supply set 172, in addition to various trays with paper sizes, provides an auto switch feature 192 and an auto paper select feature 194. The copy quality set 174 merely illustrates a type of feature that could be provided in icon form to be able to select lighter and darker copy quality. Finally, reduction enlarged set 176 shows other options to be able to provide this feature such as appropriate buttons 198 and 200 to be able to select a variable magnification from 64 up to 155% with a window 202 displaying the appropriate percentage. The significance of FIGS. 5 and 6 is that various formats can be used to provide and make available features for the operator to select to customize a control panel. In any case, once a control panel has been customized in the scaled representation reduced display 120 by suitable selecting in arranging the features, the customized control panel by selecting a suitable button such as save/close 134 is stored for future use for specific requirements.

Figure 7:
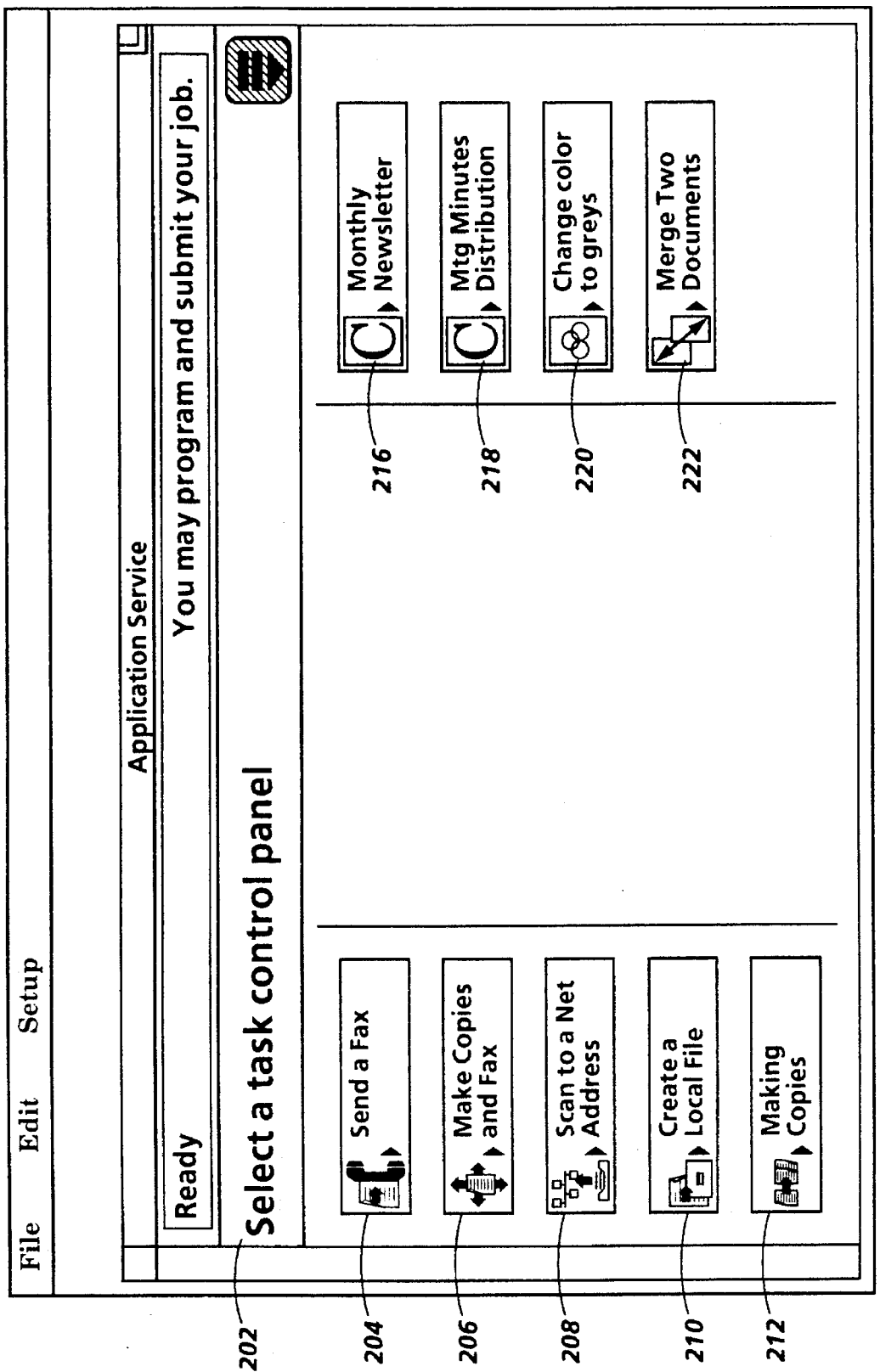
FIGS. 7–10 are screens illustrating customized control panels in accordance with the present invention While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

Assuming that various customized control panels for specific job requirements have been prepared and stored in memory, a suitable control panel such as shown in FIG. 7, provides the operator with access to the stored customized panels. For example, a suitable activated panel such as shown in FIG. 7 will prompt the operator at 202 to select a task control panel. Various panel options are illustrated, for example, send a fax 204, make copies and fax 206, scan to a net address 208, create a local file 210, make copies 212, monthly newsletter 216, meeting minutes distribution 218, change colors to grays 220, and merge two documents 222. Each of these soft buttons on the display screen will access a control panel or set of control panels peculiar to the particular requirement.

Figure 8:
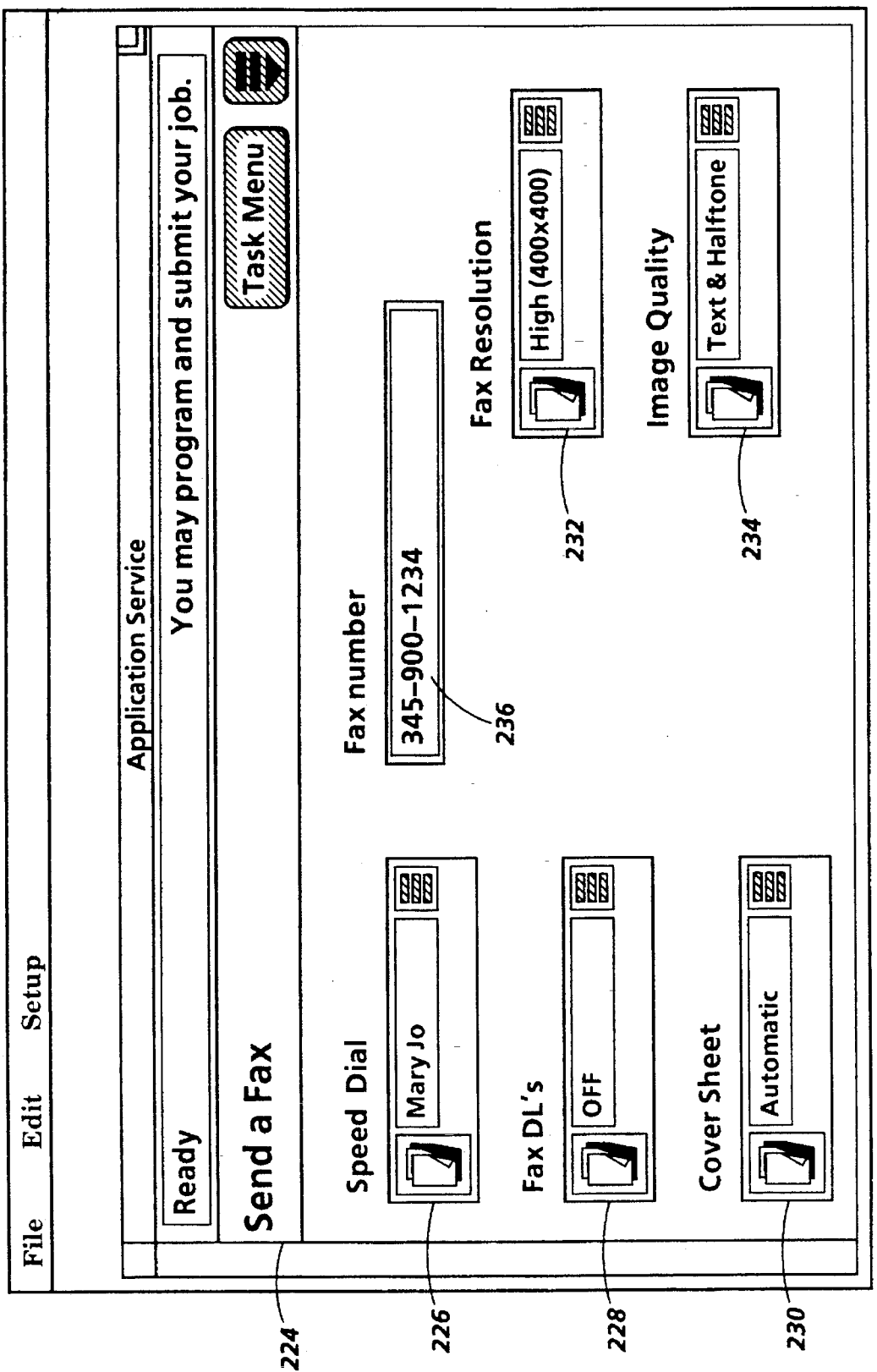

For example, assuming the operator intends to send a fax, the operator will activate send a fax button 204. This will recall from memory the send a fax special customized panel for sending faxes as illustrated in FIG. 8. A typical send a fax control panel would include a send a fax description at 224, a speed dial option at 226, a fax to a distribution list option 228, a cover sheet option 230, a fax resolution option or feature 232, and image quality 234 and a fax number window display 236.

Figure 9:
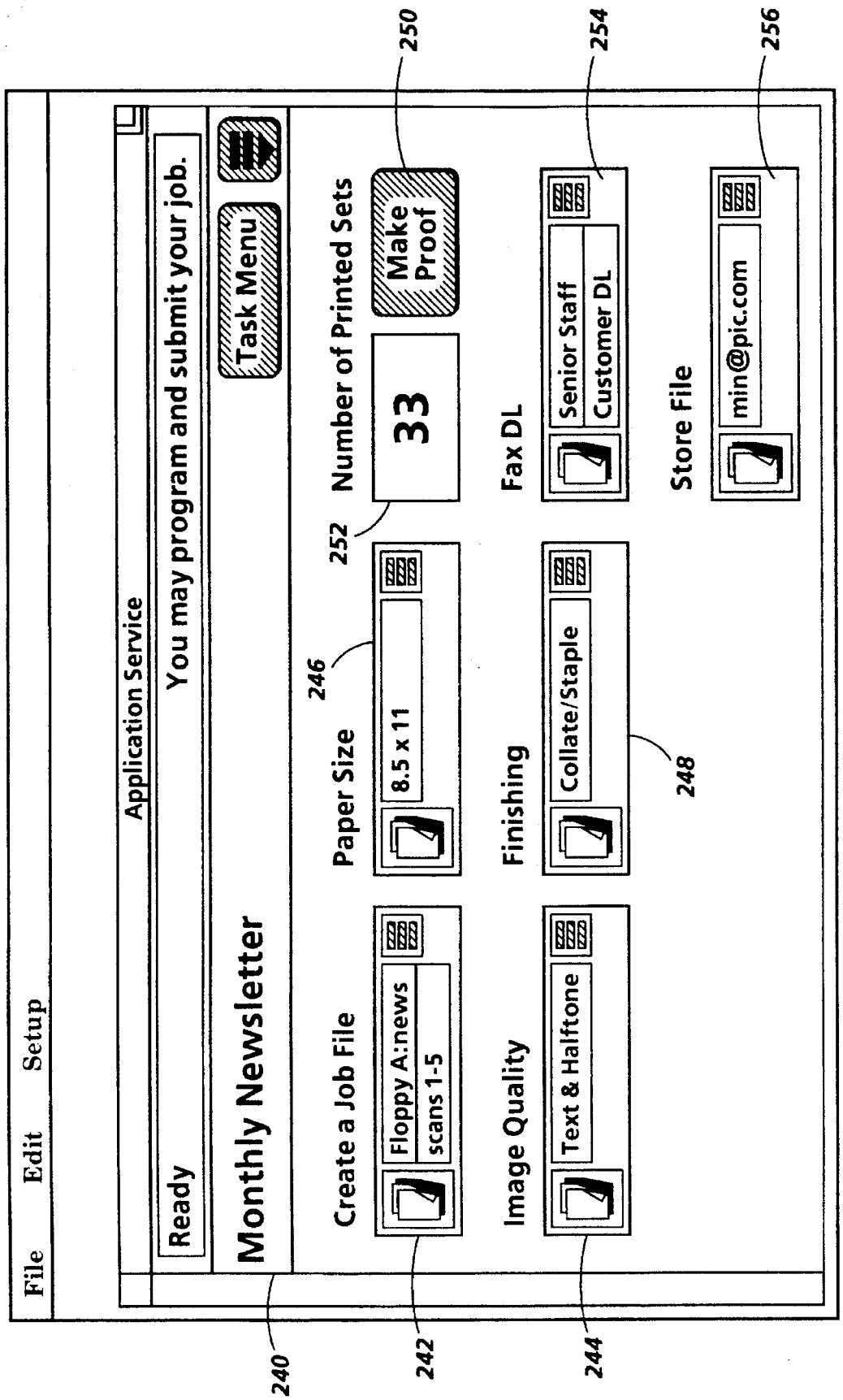

Referring back to FIG. 7, an operator might wish to send out a monthly newsletter. Assuming the operator wishes to send out a monthly newsletter, the operator would engage button 216 as illustrated in FIG. 7 resulting in the display of the customized control panel shown in FIG. 9. With reference to FIG. 9, there is the control panel description shown at 240 and various options or features for the operator to select to distribute the monthly newsletter. In particular, there is a create a job file option 242, and image quality option 244, paper size option 246, and finishing option such as collated/stapled shown at 248. Also there are options to make a proof of a printed set at 250 and also a window at 252 to display the number of printed sets, as well as an option to Fax to a designated list at 254 and a store file option at 256.

Figure 10:
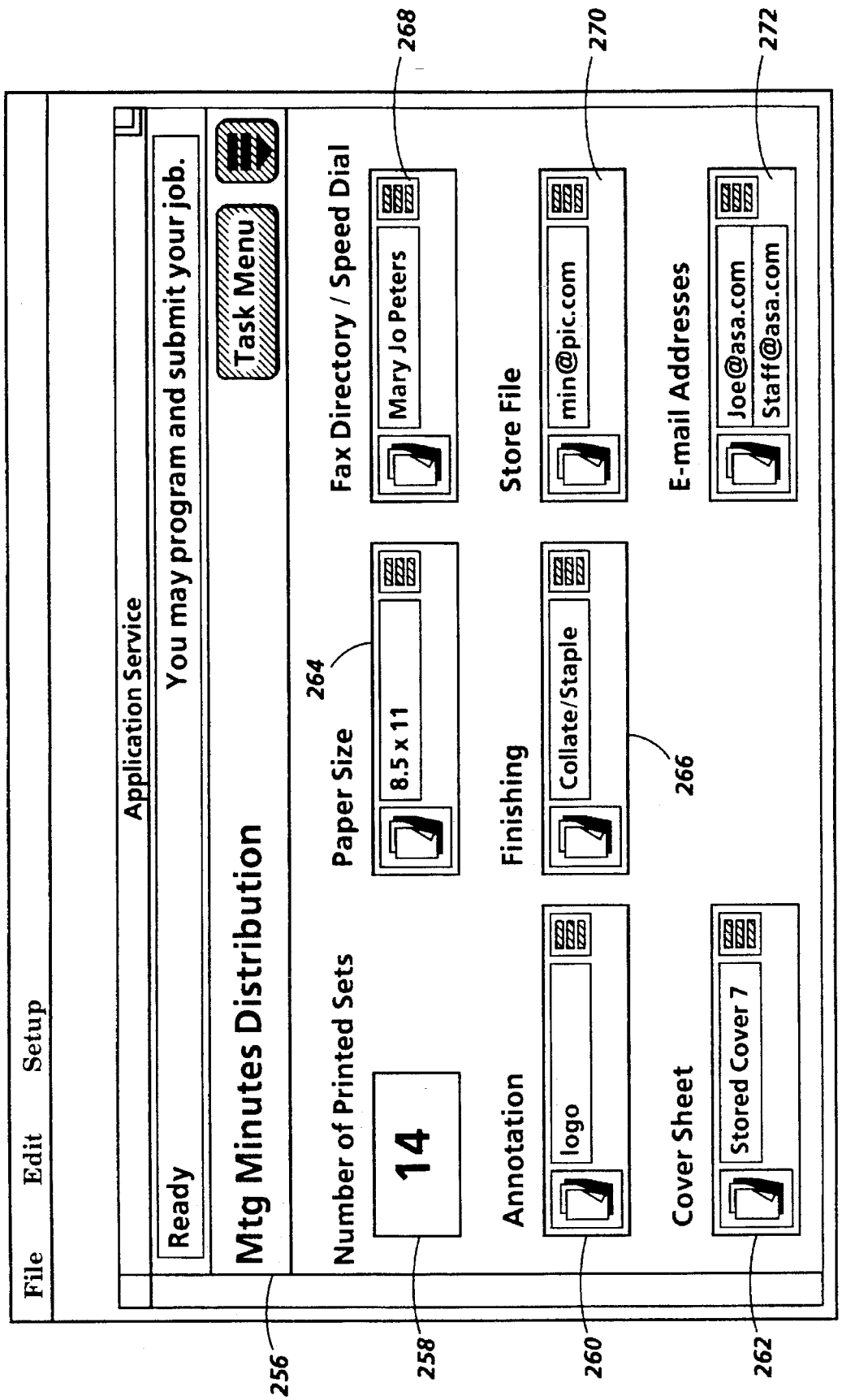

Finally, there is a customized meeting minutes distribution control panel shown in FIG. 10 resulting from the engagement of meeting minutes distribution button 218 shown in FIG. 7. In particular, the meeting minutes distribution customized control panel provides a number of printed sets option window at 258, an annotation or logo option at 260, a cover sheet options at 262, paper size option at 264, and a finishing option at 266. In addition, there is a fax delivery speed dial option at 268, a store file option at 270, and an e-mail address option at 272.

It should be noted that it is well within the scope of the present invention to provide various formats or techniques of display for the operator to not only select but also to arrange a set of features on a representation of a control panel to provide a customized control panel for given requirements. It should also be understood that the various displays as shown are merely exemplary and that customized panels could be provided for variety of user requirements.

While the invention has been described with reference to the structure disclosed, it is not confined to the details set forth, but it is intended to cover such modifications or changes as may come within the scope of the following claims.

We claim:

1. A method of customizing and storing an interface control for printing devices on a network, the network including a repository of printing device control features, the devices including an interface with screen display, comprising the steps of:

entering an interface control customizing mode providing access to a library of control features in said repository;

selecting a set of control features for use on a given device on the network;

arranging the set of control features in a given configuration on a display;

storing the set of control features and given configuration in memory; and referencing the set of control features and given configuration with a given identifier whereby upon accessing said identifier the set of control features and given configuration are provided on the interface screen display of said given device to control the operation of said given device.

2. The method of claim 1 wherein the step of arranging the set of control features in a given configuration on a display includes the step of positioning feature buttons vertically and horizontally on a scaled representation of a control screen.

3. The method of claim 1 wherein the step of storing the set of control features and given configuration in memory includes the step of storing a plurality of sets of control features and given configurations.

4. The method of claim 1 wherein the library of control features are stored in a network memory.

5. A method of customizing and storing a plurality of interface controls for a printing device having an interface with screen display, comprising the steps of:

entering an interface control customizing mode providing access to a library of control features;

selecting a first set of control features from the library control features for use on a given device;

arranging the first set of control features in a given configuration on a display;

storing the first set of control features and given configuration in memory;

selecting a second set of control features for use on said given device;

arranging the second set of control features in a given configuration on the display;

storing the second set of control features and given configuration in memory; and referencing the first and second sets of control features and given configurations with identifiers whereby upon accessing said identifiers the set of control features and given configuration are provided on the interface screen display of said given device to control the operation of said given device.

6. The method of claim 5 wherein the step of entering an interface control customizing mode includes the step of entering the mode at the interface of said device and the plurality of control features are stored in memory in said device.

7. A method of customizing an interface control for a device comprising the steps of:

entering an interface control customizing mode providing access to a plurality of control features;

providing a blank control panel on a display;

arranging a set of said control features in a given configuration on the display;

referencing the set of control features and given configuration with an identifier;

storing the set of control features and given configuration in memory;

and selecting the identifier whereby the set of control features and given configuration are provided on the interface screen display of said device.

8. In a network system interconnecting a plurality of printing devices, the network including a library of printing device control features, a user interface for customizing control panels for a device on the network comprising:

an interface button for accessing the library of printing device control features;

a designator for selecting a set of control features for use on a given control panel for a given device on the network;

a movement button for arranging the set of control features in a given configuration on the given control panel;

a memory locator for storing the set of control features and given configuration in memory; and an identifier for referencing the set of control features and given configuration in order to retrieve the set of control features and given configuration from memory for said given device.

9. The user interface of claim 8 wherein the memory locator stores a plurality of sets of control features and given configurations.

10. The user interface of claim 8 the library of control features are stored in memory in said given device.

11. The user interface of claim 8 wherein the designator for selecting a set of control features includes a menu of available features.

12. A user interface for customizing control panels for a printing device comprising:

an interface button for accessing a library of printing device control features;

a designator for selecting a set of control features for use on a control panel for the printing device;

a movement button for arranging the set of control features in a given configuration on the control panel;

a memory locator for storing the set of control features and given configuration in memory in the printing device; and an identifier for referencing the set of control features and given configuration in order to retrieve the set of control features and given configuration from memory for said printing machine.

13. The user interface of claim 12 wherein the user interface includes a scaled representation of a control panel.

14. The user interface of claim 13 including scroll buttons to slide the scaled representation in an overlay position with reference to a plurality of panels.

15. The user interface of claim 14 wherein selected features are provided on a given panel of said plurality of panels in an overlay relationship with respect to the scaled representation.

16. The user interface of claim 12 wherein the memory locator stores a plurality of sets of control features and given configurations in memory customized for said printing device.

17. The user interface of claim 12 wherein the designator for selecting a set of control features includes a menu of available features.

* * * * *